(12) United States Patent
Lymons et al.

(10) Patent No.: US 6,584,763 B2
(45) Date of Patent: Jul. 1, 2003

(54) LOCK FOR THE TRANSLATING SLEEVE OF A TURBOFAN ENGINE THRUST REVERSER

(75) Inventors: Dennis E. Lymons, El Cajon, CA (US); Colin R. Terrey, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/920,044

(22) Filed: Aug. 1, 2001

(65) Prior Publication Data

US 2003/0024236 A1 Feb. 6, 2003

(51) Int. Cl.⁷ .................................................. F02K 3/02
(52) U.S. Cl. .................................. 60/226.2; 239/265.19
(58) Field of Search .................... 60/226.2; 239/265.19, 239/265.31

(56) References Cited

U.S. PATENT DOCUMENTS

| | | | |
|---|---|---|---|
| 3,616,648 A | 11/1971 | Weise | |
| 4,922,713 A | 5/1990 | Barbarin et al. | |
| 5,228,641 A * | 7/1993 | Remlaoui | 239/265.31 |
| 5,404,714 A | 4/1995 | Davies | 60/226.2 |
| 5,927,647 A | 7/1999 | Masters et al. | 244/110 |
| 5,953,904 A | 9/1999 | Mountney | 60/226.2 |
| 6,021,636 A | 2/2000 | Johnson et al. | 60/226.2 |
| 6,138,449 A | 10/2000 | Hudson | 60/223 |
| 6,145,786 A | 11/2000 | Baudu et al. | 244/110 |
| 6,170,253 B1 * | 1/2001 | Newton | 239/265.31 |
| 6,286,784 B1 * | 9/2001 | Hardy et al. | 239/265.19 |

* cited by examiner

*Primary Examiner*—Ehud Gartenberg
(74) *Attorney, Agent, or Firm*—Baker Botts L.L.P.

(57) ABSTRACT

A cascade type thrust reverser for an air duct of a turbofan engine includes a lock mechanism mounted on a track beam that supports the translating sleeve. A locking portion of a lock member of the lock mechanism is engageable with a slider by which the translating sleeve is supported by the track beam to lock the translating sleeve in the forward, closed position.

22 Claims, 9 Drawing Sheets

LOCK FOR THE TRANSLATING SLEEVE OF A TURBOFAN ENGINE THRUST REVERSER

BACKGROUND OF THE INVENTION

The present invention relates to thrust reversers for turbofan engines and, in particular, to thrust reversers of the type having a translating sleeve, a type of thrust reverser that is often termed a "cascade type."

For normal rearward air flow through the air duct of a turbofan engine that has a cascade type thrust reverser, the translating sleeve resides in a closed position in which its forward end engages the rearward side of a torque box that forms the forward bulkhead of the thrust reverser assembly. Inner wall members of the translating sleeve form the outer wall of the rear portion of the air duct. Outer wall members of the translating sleeve are faired aerodynamically to the forward cowling of the engine.

For reverse air flow, the translating sleeve is moved rearwardly away from the forward bulkhead, leaving an outlet opening rearwardly of the forward cowling for air to be discharged generally radially from the air duct. The reverser also provides for blocking of the air duct at a location rearwardly of the outlet opening. One form of blocking system is a number of blocker doors that are pivotally mounted on the translating sleeve and are coupled by blocker door links to a cowling around the gas turbine of the engine. When the translating sleeve moves rearwardly upon deployment of the reverser, the linkages pivot the blocker doors down to a position in which they block the air duct. In another form of blocking system, the fixed inner wall members of the translating sleeve block the air duct when the translating sleeve is in the open, reverse-thrust position by having their forward, radially inner ends brought into proximity with a divergent portion of the inner wall of the air duct. When the translating sleeve is deployed for reverse thrust of the air flow, a cascade array, a series of circumferentially extending, curved deflector blades, in the outlet opening formed between the forward bulkhead and the forward end of the translating sleeve redirects the air flow in the air duct so that it flows outwardly and forwardly.

Inadvertent deployment of a turbofan engine thrust reverser during flight is an unthinkable event. Therefore, it is well-known to provide multiple locks to hold the translating sleeve of a cascade thrust reverser in the closed position and to design the locks so that they will not unlock in the event of a thrust reverser control system failure. All translating sleeve lock systems include mechanical locks integrated with the linear actuators that move the translating sleeve between the closed, forward thrust position and the open, reverse-thrust position. The actuator locks usually have mechanical springs that keep them closed and electrical (solenoidal) or hydraulic releasing elements. Despite careful design and installation, the actuator locks are not failsafe. For example, electrical faults in the control wiring, which can be caused by incidents such as a turbine rotor burst, can cause the actuator locks to release and also initiate operation of the actuators to open the translating sleeve.

In addition to the locks on the actuators, it has been proposed that the translating sleeve itself be provided with a latch that is controlled separately from the actuator locks and couples the translating sleeve to a fixed part of the thrust reverser assembly so that the translating sleeve cannot move toward open, even if the actuators are unlocked and are applying force to the translating sleeve. An example of a latch for a translating sleeve of a cascade type thrust reverser is described and shown in U.S. Pat. No. 6,021,636.

Previously proposed latches for translating sleeves of cascade type thrust reversers have involved latching the forward end of the translating sleeve to the torque box. The torque box is a robust element of the thrust reverser assembly and thus well-suited as a strong mounting location for a latch. The torque box is also located conveniently to the region forward of the torque box and within the forward outer engine cowling where space is available for valves, piping and wiring associated with a translating sleeve latch. Thus, the location of a translating sleeve latch on the forward end of the translating sleeve has advantages.

Locating a translating sleeve latch on the torque box places it relatively near the integrated mechanical locks associated with the translating sleeve actuators. Although it is extremely unlikely, there is nonetheless a chance that a turbine rotor failure or some other event could damage the translating sleeve latch in a manner that releases it and at the same time, due to their nearby location, damage components of the translating sleeve actuators in a manner that causes them to be released as well and to operate and deploy the thrust reverser to the reverse thrust position.

SUMMARY OF THE INVENTION

An object of the present invention is to provide a latch for the translating sleeve of a cascade type thrust reverser that is located remotely from the translating sleeve actuators, thus reducing the chance that a turbine rotor failure or some other event could damage both the translating sleeve latch and the translating sleeve actuator system in a manner that would cause the translating sleeve to move to the reverse thrust position. It is also an object to provide a latch for a translating sleeve that is of simple construction, light in weight, and requires little space. Yet another object is to provide a translating sleeve latch that is functionally highly reliable.

The foregoing objects are attained, in accordance with the present invention, by a thrust reverser for an air duct of a turbofan engine that includes a torque box structure adapted to be mounted on the rearward end of a forward outer fan housing of an air turbine of the engine, a track beam affixed to and extending rearwardly from the torque box structure and having an elongated slideway, a slider received by the slideway for sliding movement, and a translating sleeve coupled to the slider. A releasable lock mechanism mounted on the track beam includes a lock member having a locking portion that when in a locked position of the lock member is engageable with the slider to lock the translating sleeve in the closed position and when in an unlocked position is disengaged from the slider so that the translating sleeve may be moved to the open position.

The location of the lock mechanism on a track beam of the thrust reverser, a position that makes it somewhat remote from the locks associated with the actuators, reduces the chance that a rotor burst will damage both the actuator locks and the lock associated with the translating sleeve itself. The association of the lock mechanism with a track beam and the engagement of the locking portion of the lock member with a slider provides a strong connection between the locked translating sleeve and the torque box structure and also permits the lock mechanism to be of a relatively simple construction. For example, the lock mechanism makes it unnecessary to incorporate structure in the translating sleeve to accept a latch lever.

In an advantageous arrangement, the lock member is a lock pin that translates along an axis, thus avoiding the need for, for example, a pivoting latch hook and an associated bracket. In most cases, it is preferred that the locking portion of the lock pin be received in the slideway of the track beam adjacent and rearwardly of the rearward end of the slider. That location avoids the need to have a notch or hole in the slider to accept the lock pin. When there is insufficient room at the rearward end of the track beam to allow the lock pin and an actuator associated with the lock pin to be located to be engageable with the rearward end of the slider, the lock pin and actuator can be located remotely from the rearward end of the track beam, and a hole or notch can be provided in the slider to accept the locking portion of the lock pin.

In desirable arrangements, the locking portion of the lock pin is movable with a close sliding fit through a hole in a wall member that defines a portion of the slideway associated with the track beam. In such arrangements, the pin is robustly supported by the wall member and is loaded in shear when in the locked position, thus avoiding the imposition of large flexural stresses on the lock pin.

In preferred embodiments of the present invention, the lock member is moved between the locked and unlocked positions by a linear actuator that has an actuating rod coupled to the lock pin. In an arrangement that uses limited space efficiently, the actuator may be positioned such that the actuating rod is movable along an axis that is substantially parallel to the axis of the thrust reverser, and the lock pin is movable along an axis substantially perpendicular to the axis of the actuating rod. Where space permits, the actuator may be mounted with its actuating rod perpendicular to a plane that includes the axes of the thrust reverser and the slideway with which the lock is associated. Such an arrangement has the advantages of mechanical simplicity and light weight.

When a linear actuator is used to move the lock pin and the actuator is oriented longitudinally of the track beam, various drive couplings may be provided between the output element of the actuator and the lock pin. Generally, a cam coupling will be suitable. The cam coupling may be a simple face cam with a cam surface oblique to the axes of the lock pin and the output element of the actuator. Another suitable cam coupling includes a slot in the lock pin, a cam follower shaft transecting the slot, and a slide block that is received in the slot and has a cam slot receiving the follower shaft.

As is well-known to those skilled in the art, there are various designs of cascade-type thrust reversers. Some have a unitary translating sleeve that is supported by a slideway on each of a pair of track beams that straddle a pylon or strut by which the engine is mounted on the aircraft. Others have two translating sleeve units, one on each side of a diametrical plane of the engine, which are mechanically coupled at a location diametrically opposite the pylon or strut—designs of this type usually are hinged to the track beams adjacent the pylon or strut so that they can be swung open for access to the engine. In the aforementioned designs, it suffices to provide a single lock mechanism on one of the track beams. In thrust reversers having two separate translating sleeve units, which are independently mounted on upper and lower pairs of track beams and not mechanically connected, a lock mechanism is provided on a track beam of each translating sleeve unit—i.e., two lock mechanisms, one for each unit, are provided.

The actuators associated with the lock pins of lock mechanisms embodying the present invention may be hydraulically, pneumatically, or electrically powered and may have either linear or rotary outputs.

For a better understanding of the invention, reference may be made to the following description of exemplary embodiments, taken in conjunction with the accompanying drawings.

DESCRIPTION OF THE EMBODIMENTS

Figure 1:
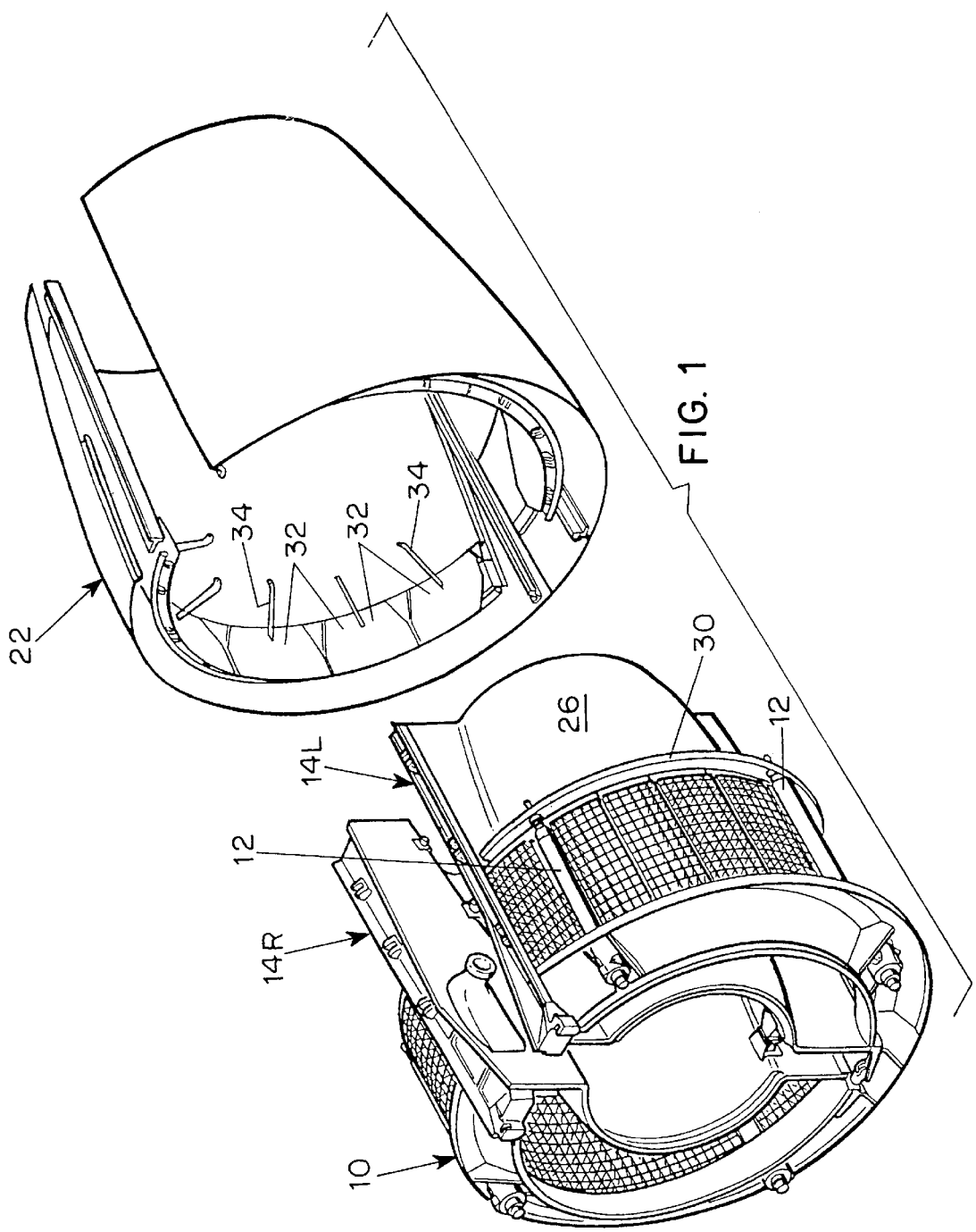
FIG. 1 is an exploded perspective overall view of one design of a cascade type fan thrust reverser, the view being taken from a vantage point to the left, in front, and above.
Figure 2:
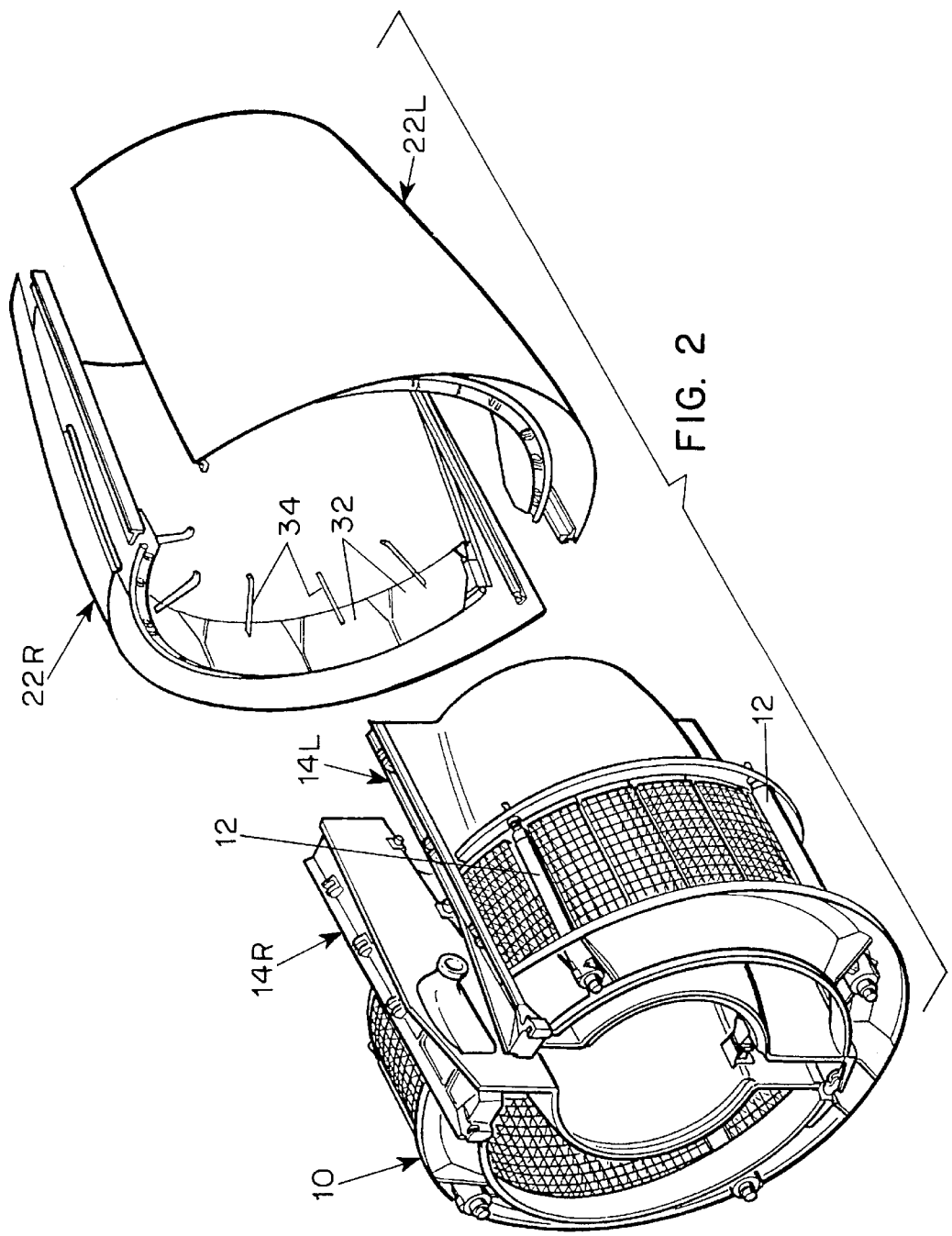
FIG. 2 is an exploded perspective overall view of another design of a cascade type fan thrust reverser, the view being taken from a vantage point to the left, in front, and above.
Figure 3:
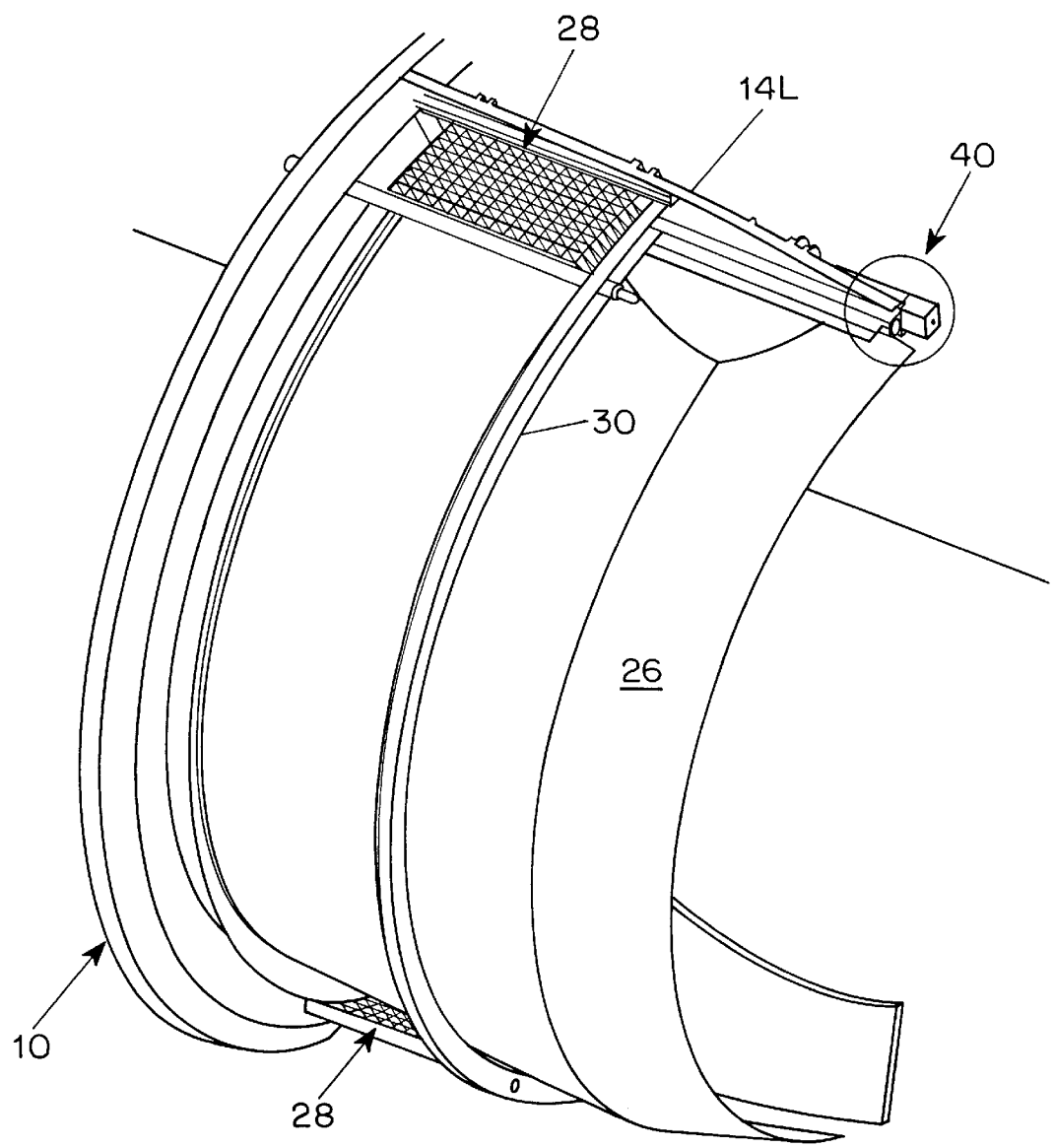
FIG. 3 is a schematic perspective view of the left rear part of the rear structure of a thrust reverser embodying the present invention, the view being taken from a vantage point to the left, behind, and above.
Figure 4:
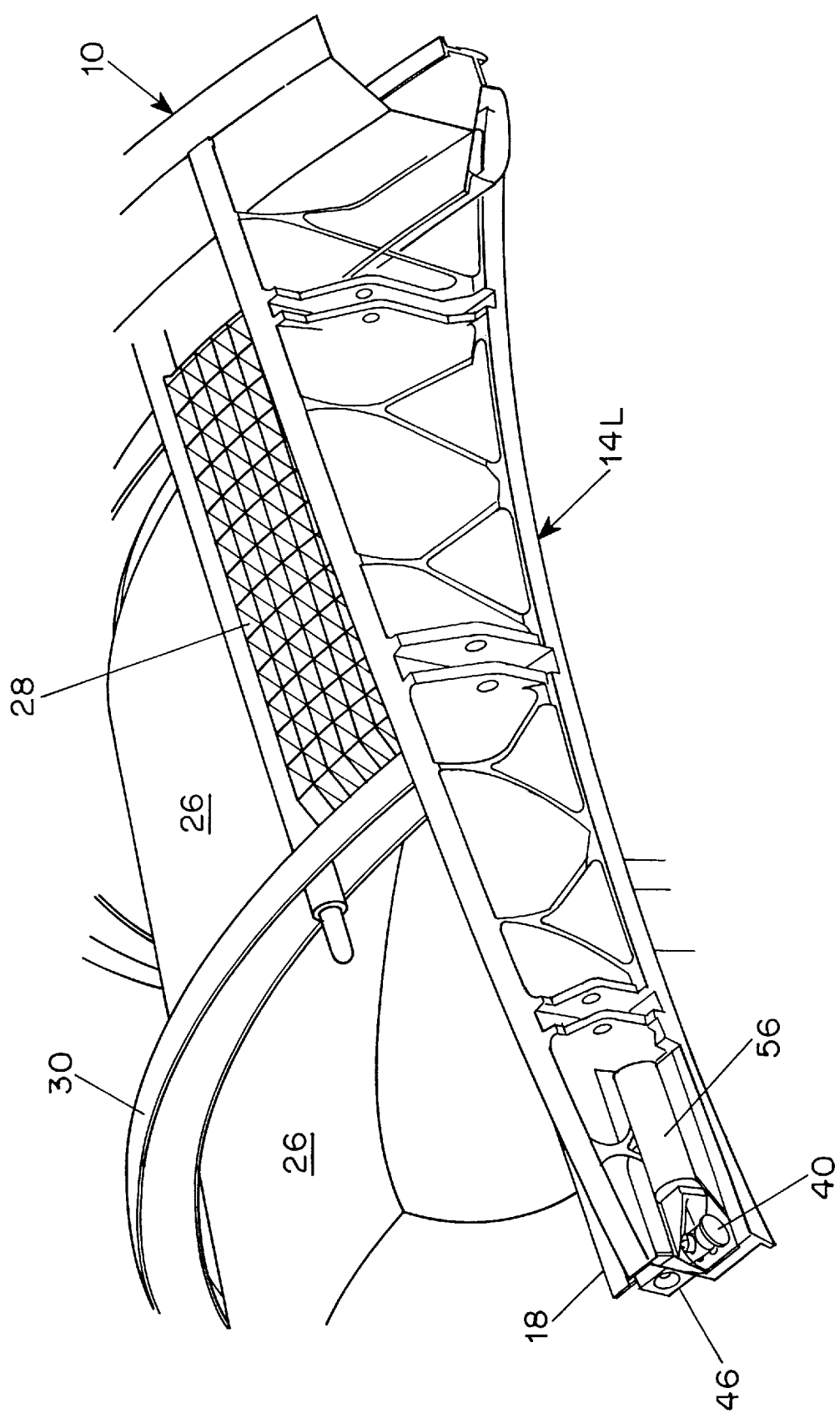
FIG. 4 is a schematic perspective view of a portion of the left rear part of the thrust reverser shown in FIG. 3, the view being taken from a vantage point to the right, behind, and above.
Figure 5:
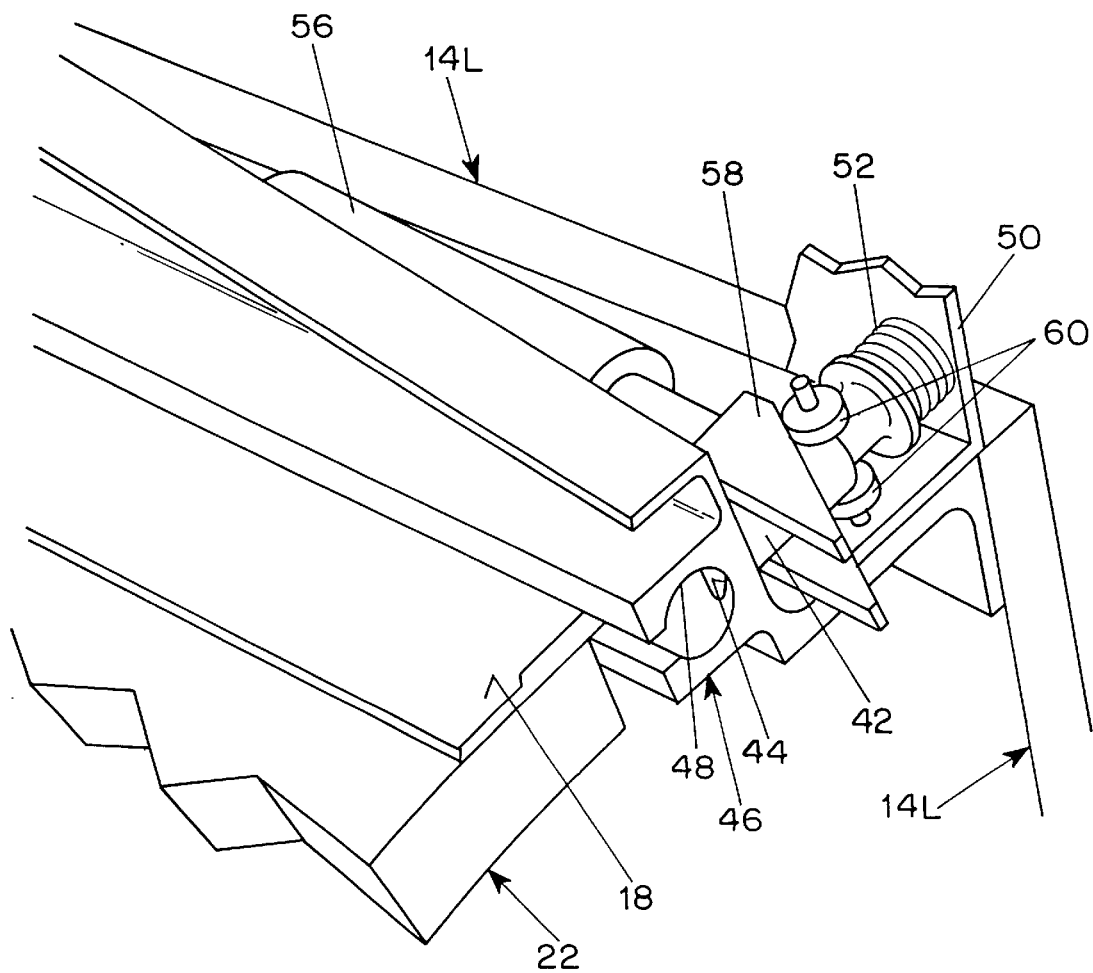
FIG. 5 is a schematic detail perspective view of the lock mechanism of FIGS. 3 and 4, the view being taken from a vantage point to the left, behind, and above and showing the lock pin in the unlocked position.

For general background and orientation, FIGS. 1 and 2 show typical fan thrust reversers of the cascade type. At the front is a torque box structure 10, which is constructed to be mounted on the rearward end of the forward outer fan housing of the air turbine of the engine (not shown) and serves as a mounting location for various elements and systems, including actuators 12 for the translating sleeve, locks associated with the actuators, wiring, and controls. A pair of upper track beams 14R and 14L and a pair of lower track beams (not visible) are affixed to and extend rearwardly from the torque box structure. Each track beam is designed to be affixed to a pylon or strut by which the engine is mounted on the aircraft and has an elongated slideway (the slideways are not clearly visible in FIG. 1), which receives a slider 18 that is affixed to the translating sleeve 22. The sliders are usually aluminum extrusions of either "T" or "lollypop" shape in cross section. Each slideway has a groove having a shape in cross section that is complementary to the shape of the head portion of the slider and that opens at the laterally outer wall of the slideway through a slot. Each slider is received in a slideway with a close sliding fit. The translating sleeve 22 of the thrust reverser shown in FIG. 1 is unitary. The thrust reverser shown in FIG. 2 has a right translating sleeve half 22R and a left translating sleeve half 22L, the two halves being independently supported by the track beams. Unless otherwise stated, the term "translating sleeve" is used herein to refer to unitary translating sleeves (FIG. 1), separate translating sleeve halves that are mechanically coupled, and separate translating sleeve halves that are independently mounted (FIG. 2).

The translating sleeve 22 (or the translating sleeve halves 22R and 22L) is driven by the actuators 12 between a closed position adjacent the torque box structure 10 and an open position spaced apart axially to the rear of the torque box structure. In the forward, closed position for normal rearward air flow through the engine air duct, the translating sleeve forms the outer wall of the portion of the air duct to the rear of the torque box structure. The rear part of the air duct is defined radially inwardly by a fixed barrel 26, which is joined to the torque box structure 10. In the rearward, open position of the translating sleeve, an outlet opening for discharge of air from the air duct of the engine fan is formed between the torque box structure and the forward end of the translating sleeve. A cascade array 28, which surrounds the portions of the air duct circumferentially between the upper and lower tracks and is located in the opening formed when the translating sleeve is in the rearward position for reverse thrust, is affixed to the torque box structure 10 and a rear support ring 30. Blocker doors 32 reside flush with the inner wall of the translating sleeve in the normal, forward (closed) position of the translating sleeve and are pivoted inwardly by blocker door links 34 so as to block the air duct at a location to the rear of the outlet opening when the translating sleeve is moved to the rearward, reverse thrust position.

Referring to FIGS. 3 to 6, a lock mechanism 40 is mounted on the rearward end of the left upper track 14L and normally is retained in a locked condition in which it prevents the translating sleeve 22 from moving from the forward thrust, closed position, even if the actuators are unlocked and powered to apply a force on the translating sleeve. The lock mechanism 40 includes a lock pin 42 having a locking portion 421 that when in the locked position of the lock mechanism is engageable with the slider 18 so as to prevent the slider from moving rearwardly. The lock pin 42 is received with a close sliding clearance through a hole 44 in the wall of the slideway member 46 that forms the slideway 48 for the head portion of the slider 18; in the illustrated embodiment, the slider is of "lollypop" shape in cross section. The lock pin 42 is supported in a bracket 50 (which is shown with portions broken away in FIGS. 5 and 6) and is biased by a spring 52 in a direction to position it in the locked position in which the locking tip portion 421 resides closely adjacent the rearward end of the slider 18. In the locked position, the lock pin blocks the rearward end of the groove 48 of the slideway and prevents the slider 18, and thus the translating sleeve 22, from moving rearwardly, even if the actuators are unlocked and are applying forces to the translating sleeve in a direction to move it to the rearward, reverse thrust position.

Figure 6:
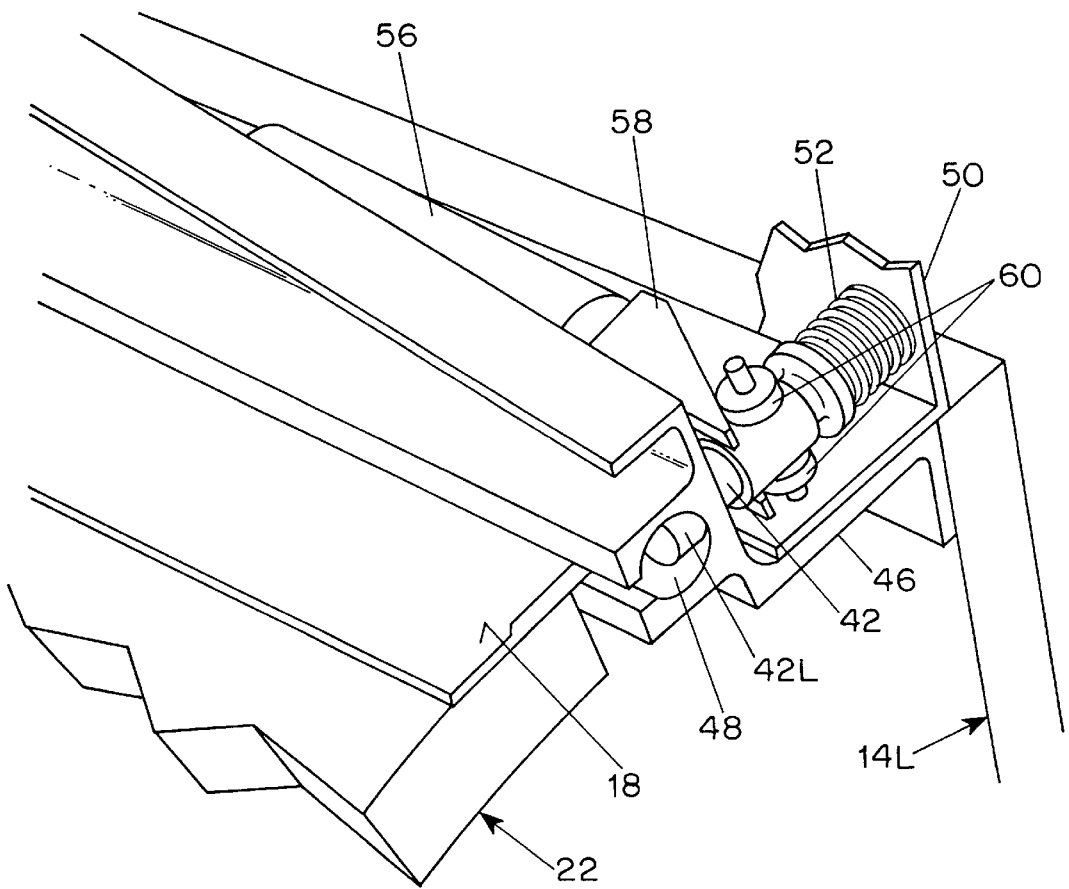
FIG. 6 is a view similar to FIG. 5 but shows the lock pin in the locked position.

A linear actuator 56, which may be a hydraulic, pneumatic or electric actuator, is mounted on the left upper track 14L. The actuator is mounted with its axis parallel to the center axis of the translating sleeve. A bifurcated face cam 58 works against follower rollers 60 on the lock pin 42. The actuator is, of course, powered only when the lock pin is to be moved to the unlocked position for deployment of the translating sleeve. At all other times, the spring 52 holds the lock pin 42 in the locked position (FIG. 6).

Figure 7:
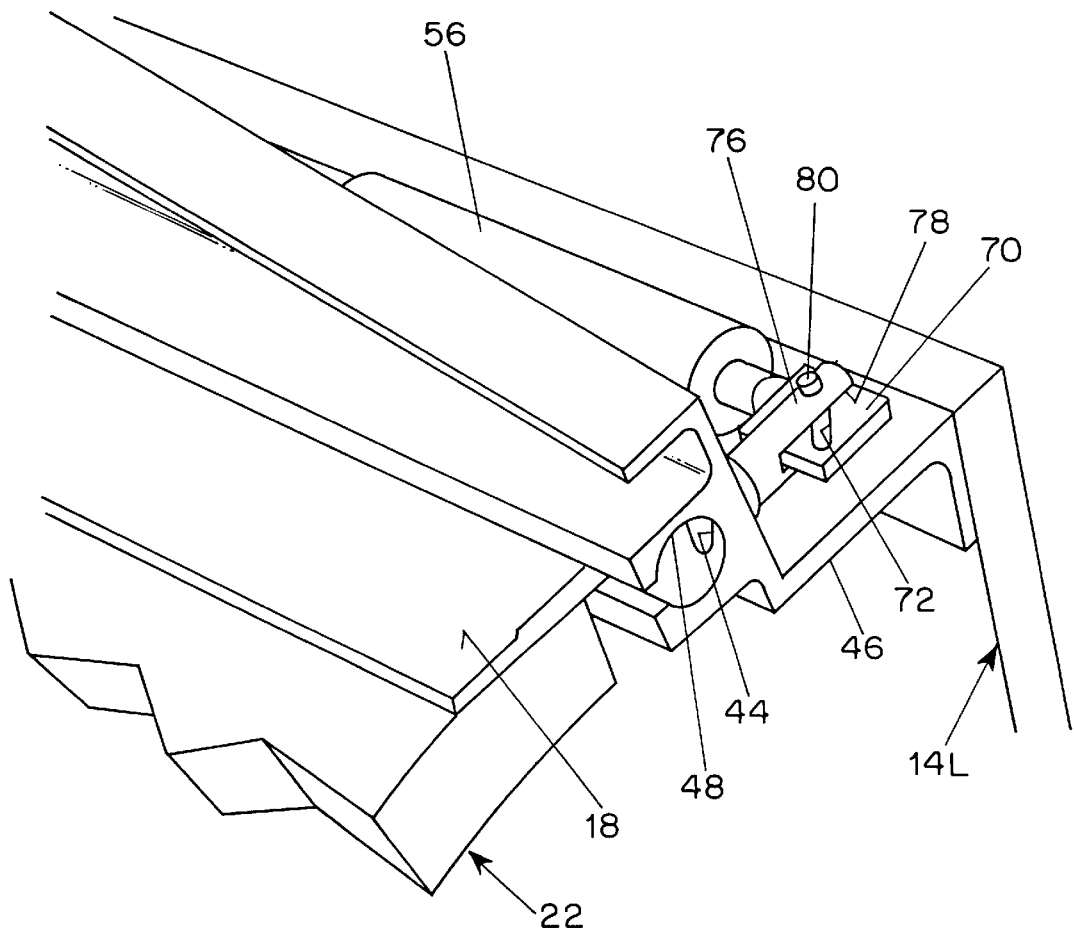
FIG. 7 is a schematic detail perspective view of a lock mechanism similar to that of FIGS. 3 to 6 but having another form of cam coupling, the view being taken from a vantage point to the left, behind, and above and showing the lock pin in the unlocked position.
Figure 8:
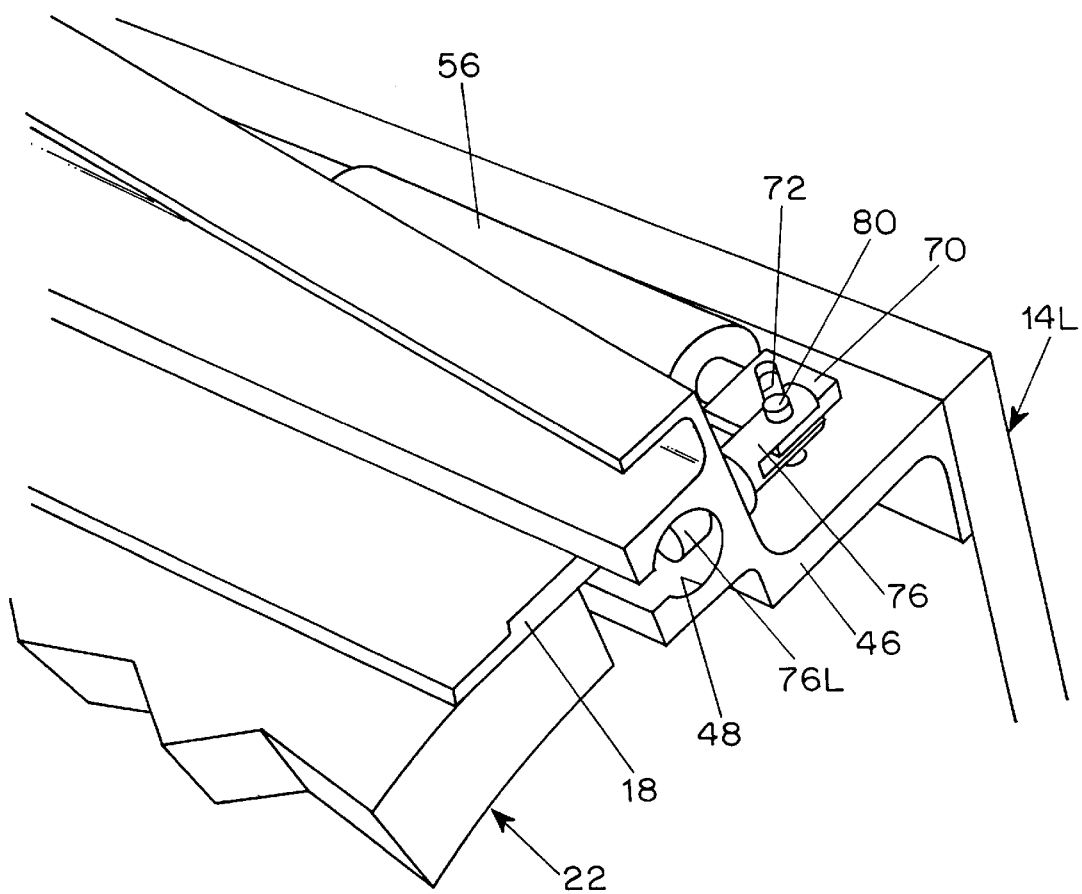
FIG. 8 is a view similar to FIG. 7 but shows the lock pin in the locked position.

The face cam of FIGS. 3 to 6 is merely exemplary of many well-known mechanical transducers for coupling a driving member moving along one path to a driven member moving along a path oblique to the path of the driving member. Representative of numerous other mechanical transducers is the arrangement of FIGS. 7 and 8, which show a slide block cam. A slide block 70 having a cam slot 72 oriented obliquely to both the direction of the linear output force of the actuator 56 and the direction of movement of the lock pin 76 is received in a slot 78 in the lock pin 76 and is linked to the lock pin by a follower shaft 80 that passes through holes in the lock pin on either side of the slot 78 and is affixed to the lock pin. The actuator 56 is of a type that includes a mechanical spring that biases the slide block 70 in a direction such that the cam slot 72, working against the follower shaft 80, normally holds the lock pin in the locked position in which the locking portion 761 resides within the slideway 48 (see FIG. 8). When the actuator 56 is powered, the slide block is moved against the bias of the spring, thereby pulling the locking portion 761 of the lock pin 76 out of the blocking position in the slideway groove 48 and permitting the translating sleeve 22 to move from the closed position.

Figure 9:
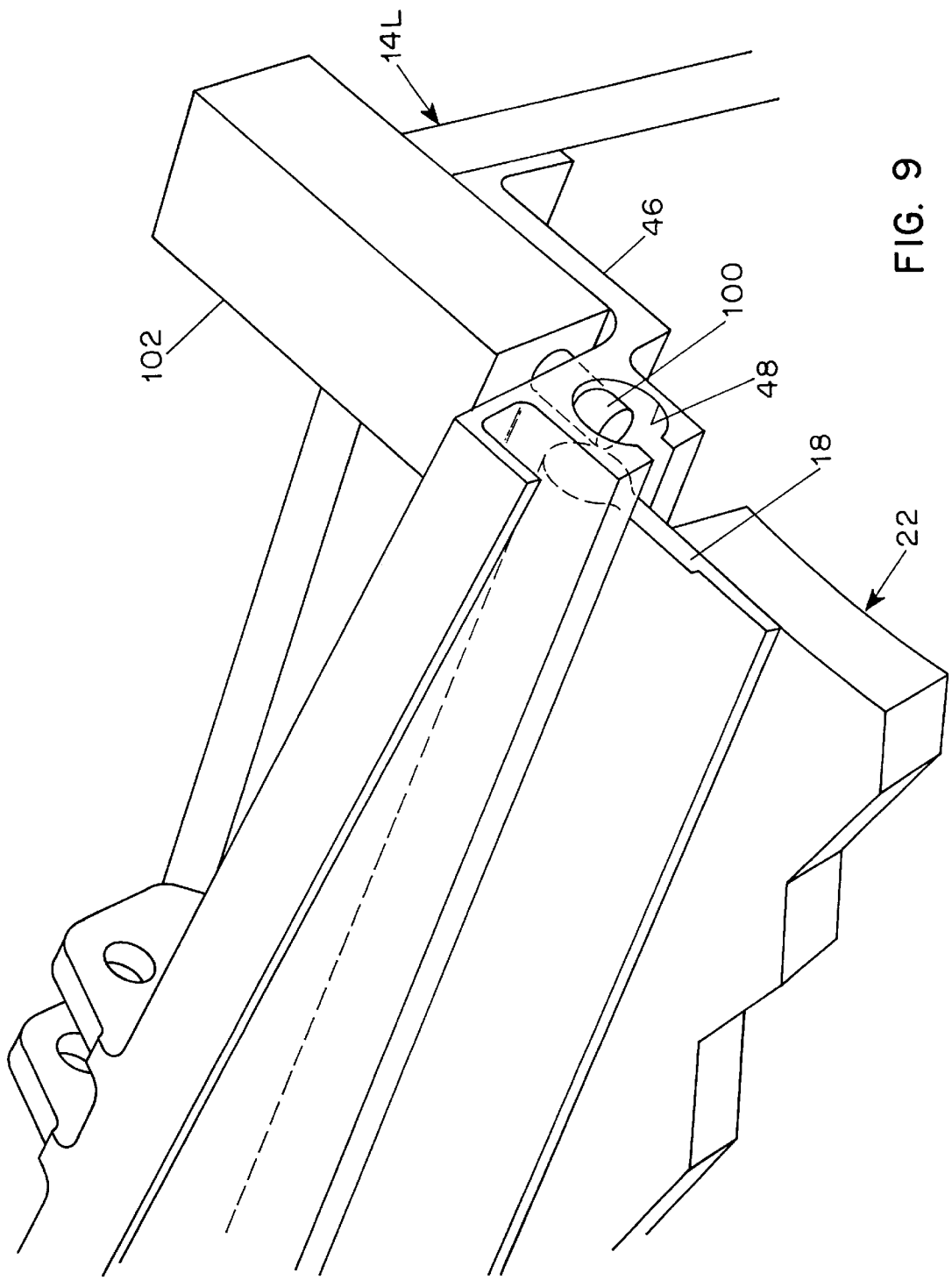
FIG. 9 is a schematic detail perspective view of another lock mechanism, the view being taken from a vantage point to the left, behind, and above and showing the lock pin in the locked position.

When the space available at the rearward end of a track beam permits, a lock pin 100 may be driven coaxially with the output of a linear actuator 102, as shown in FIG. 9.

As mentioned above, when there is not enough space to allow a translating sleeve lock mechanism to be located such that the lock pin can protrude into the slideway of the track beam closely adjacent and rearwardly of the slider, the lock mechanism can be installed forwardly of the rearward end of the translating sleeve and a hole can be provided in the head portion of the slider to receive the locking portion of the lock pin.

The lock mechanism should have controls separate from those of the locks of the translating sleeve actuators to reduce the possibility of both the actuator locks and the translating sleeve lock being activated by a common electrical fault. The lock mechanism should also have a sensor and signal system for providing an indication in the cockpit of its status. A removable cover should be provided to protect the lock mechanism. For maintenance of the reverser, suitable provisions may be made in the lock pin or the actuator to facilitate manual release of the lock mechanism by a mechanic.

What is claimed is:

1. A thrust reverser for an air duct of a turbofan engine, comprising
    a torque box structure adapted to be mounted on the rearward end of a forward outer fan housing of an air turbine of the engine,
    a track beam affixed to and extending rearwardly from the torque box structure and having an elongated slideway,
    a slider received by the slideway for sliding movement,
    a translating sleeve coupled to the slider, and
    a releasable lock mechanism mounted on the track beam and including a lock member having a locking portion that when in a locked position of the lock member is engageable with the slider to lock the translating sleeve in the closed position and when in an unlocked position is disengaged from the slider so that the translating sleeve may be moved to the open position.

2. The thrust reverser according to claim 1, wherein the lock member is a lock pin that translates along an axis.

3. The thrust reverser according to claim 2, wherein the locking portion of the lock pin is received in the slideway and is engageable with a portion of the slide received within the slideway when in the locked position.

4. The thrust reverser according to claim 3, wherein the locking portion of the lock pin is received adjacent and rearward of a rearward end of the slider when in the locked position so as to be engageable with the rearward end of the slider.

5. The thrust reverser according to claim 2, wherein the locking portion of the lock pin is movable with a close sliding fit through a hole in a wall member that defines the slideway.

6. The thrust reverser according to claim 1, wherein the lock member is a lock pin that translates along an axis and the lock mechanism includes a linear actuator coupled to the lock pin.

7. The thrust reverser according to claim 6, the linear actuator has a drive member that is movable along an axis and is positioned such that the axis is substantially parallel to the axis of the thrust reverser, and the lock pin is movable along an axis substantially perpendicular to the axis of the drive member.

8. The thrust reverser according to claim 7, wherein the linear actuator is coupled to the lock pin by a cam coupling.

9. The thrust reverser according to claim 8, wherein the cam coupling includes a face cam coupled to the linear actuator and a cam follower coupled to the lock pin.

10. The thrust reverser according to claim 8, wherein a mechanical spring biases the lock pin in a direction to move the lock member to the locked position and the linear actuator operates to move the lock pin to the unlocked position against the bias of the spring.

11. The thrust reverser according to claim 9, wherein the cam coupling includes a slot in the lock pin, a cam follower shaft transecting the slot and affixed to the lock pin, and a slide block coupled to the linear actuator, received in the slot and having a cam slot receiving the follower shaft.

12. The thrust reverser according to claim 11, wherein the linear actuator includes a mechanical spring that biases the slide block in a direction to move the lock member to the locked position.

13. The thrust reverser according to claim 6, the linear actuator has a drive member that is movable along an axis and is positioned such that the axis is substantially perpendicular to a plane that includes a longitudinal axis of the thrust reverser, and the lock pin is movable substantially coaxially of the drive member.

14. The thrust reverser according to claim 10, wherein the locking portion of the lock pin is received in the slideway and is engageable with a portion of the slide received within the slideway when in the locked position.

15. The thrust reverser according to claim 14, wherein the locking portion of the lock pin is received adjacent and rearward of a rearward end of the slider when in the locked position so as to be engageable with the rearward end of the slider.

16. The thrust reverser according to claim 14, wherein the locking portion of the lock pin is movable with a close sliding fit through a hole in a wall member that defines the slideway.

17. The thrust reverser according to claim 14, wherein the locking portion of the lock pin is received in the slideway and is engageable with a portion of the slide received within the slideway when in the locked position.

18. The thrust reverser according to claim 17, wherein the locking portion of the lock pin is received adjacent and rearward of a rearward end of the slider when in the locked position so as to be engageable with the rearward end of the slider.

19. The thrust reverser according to claim 17, wherein the locking portion of the lock pin is movable with a close sliding fit through a hole in a wall member that defines the slideway.

20. The thrust reverser according to claim 13, wherein the locking portion of the lock pin is received in the slideway and is engageable with a portion of the slide received within the slideway when in the locked position.

21. The thrust reverser according to claim 20, wherein the locking portion of the lock pin is received adjacent and rearward of a rearward end of the slider when in the locked position so as to be engageable with the rearward end of the slider.

22. The thrust reverser according to claim 20, wherein the locking portion of the lock pin is movable with a close sliding fit through a hole in a wall member that defines the slideway.

* * * * *